(12) United States Patent
Tanaka

(10) Patent No.: US 10,381,864 B2
(45) Date of Patent: Aug. 13, 2019

(54) SEMICONDUCTOR DEVICE, POWER SOURCE UNIT, AND ELECTRICAL DEVICE

(71) Applicant: LAPIS SEMICONDUCTOR CO., LTD., Kanagawa (JP)

(72) Inventor: Kouhei Tanaka, Kanagawa (JP)

(73) Assignee: LAPIS SEMICONDUCTOR CO., LTD., Kanagawa (JP)

( * ) Notice: Subject to any disclaimer, the term of this patent is extended or adjusted under 35 U.S.C. 154(b) by 526 days.

(21) Appl. No.: 15/060,978

(22) Filed: Mar. 4, 2016

(65) Prior Publication Data

US 2016/0276836 A1    Sep. 22, 2016

(30) Foreign Application Priority Data

Mar. 19, 2015  (JP) .................................. 2015-056588

(51) Int. Cl.
*H02J 7/35* (2006.01)
*H02J 7/34* (2006.01)

(52) U.S. Cl.
CPC ................ *H02J 7/35* (2013.01); *H02J 7/345* (2013.01); *Y02E 10/566* (2013.01)

(58) Field of Classification Search
None
See application file for complete search history.

(56) References Cited

U.S. PATENT DOCUMENTS 6,147,517 A * 11/2000 AlNahas .......... H03K 3/356113
                                                    327/65
6,157,165 A * 12/2000 Kinoshita ............. H02J 7/0019
                                                    320/116

FOREIGN PATENT DOCUMENTS

| JP | H06-006934 A | 1/1994 |
|---|---|---|
| JP | H06-046538 A | 2/1994 |
| JP | H09-114529 A | 5/1997 |
| JP | 2006-010463 A | 1/2006 |
| JP | 2008-125176 A | 5/2008 |

OTHER PUBLICATIONS

Office Action for Japanese Patent Application No. 2015-056588 Issued by Japan Patent Office (JPO) dated Oct. 2, 2018.

* cited by examiner

*Primary Examiner* — Thienvu V Tran
*Assistant Examiner* — David M Stables
(74) *Attorney, Agent, or Firm* — Kubotera & Associates, LLC

(57) ABSTRACT

A semiconductor device includes a first signal outputting portion; a second signal outputting portion; and a voltage outputting portion. The first signal outputting portion compares a first voltage output from a first power source and a second voltage output from a second power source, and to output a comparison result. The second signal outputting portion determines whether the second voltage is greater than a threshold voltage, and to output a determination result. The voltage outputting portion outputs the second voltage from an output terminal when the second voltage is greater than the threshold voltage. Further, the voltage outputting portion outputs one of the first voltage and the second voltage from the output terminal when the second voltage is smaller than the threshold voltage.

11 Claims, 12 Drawing Sheets

| S1 | S2 | Q |
|----|----|---|
| 0 | 0 | 1 |
| 0 | 1 | 0 |
| 1 | 0 | 0 |
| 1 | 1 | 0 |

VS > VB: S1=1
VS < VB: S1=0
VS > VSOH: S2=1
VS < VSOH: S2=0

FIG. 4

| S1 | S2 | S3 | Q1 | Q2 |
|---|---|---|---|---|
| 0 | 0 | 0 | 1 | 0 |
|   |   | 1 |   |   |
| 0 | 1 | 0 | 0 | 0 |
|   |   | 1 | 0 | 1 |
| 1 | 0 | 0 | 0 | 0 |
|   |   | 1 | 0 | 1 |
| 1 | 1 | 0 | 0 | 0 |
|   |   | 1 | 0 | 1 |

VS > VB: S1=1
VS < VB: S1=0
VS > VSOH: S2=1
VS < VSOH: S2=0
VS > VDD: S3=1
VS < VDD: S3=0

FIG. 7

SEMICONDUCTOR DEVICE, POWER SOURCE UNIT, AND ELECTRICAL DEVICE

BACKGROUND OF THE INVENTION AND RELATED ART STATEMENT

The present invention relates to a semiconductor device, a power source unit, and an electrical device.

In a conventional power source unit, a conventional switching circuit may be provided for switching a plurality of power sources. Patent Reference 1 has disclosed an example of the conventional power source unit. According to Patent Reference 1, the conventional power source unit includes a power source supplied from a solar battery and a conventional switching circuit configured to selectively switch to a power source supplied from a primary battery. When a predetermined voltage is secured, the conventional switching circuit is configured to turn off the power supply from the primary battery and turn on the power supply from the solar battery. When a predetermined voltage is not secured, the conventional switching circuit is configured to turn on the power supply from the primary battery.

Patent Reference 1: Japanese Patent Publication No. 2006-10463

Patent Reference 2 has disclosed an example of a conventional wireless communication device. According to Patent Reference 2, the conventional wireless communication device includes a solar battery, a rechargeable battery, and a selection control unit. The selection control unit is configured to start with an internal capacitor, and to select one of the solar battery and the rechargeable battery.

In the conventional wireless communication device disclosed in Patent Reference 2, when a voltage value of the solar battery is greater than 1 V, the selection control unit selects the solar battery to supply power to a CPU (Central Processing Unit). When the voltage value of the solar battery becomes 2 V, the selection control unit selects the rechargeable battery to supply power to the CPU. Afterward, when the rechargeable value of the solar battery is less than 1 V, the selection control unit selects the rechargeable to supply power to the CPU. When the voltage value of the solar battery, which is measured repeatedly per specific constant time, is greater than 2 V, the selection control unit selects the solar battery to supply power to the CPU.

Patent Reference 2: Japanese Patent Publication No. 06-46538

When the conventional power source unit includes two types of batteries such as a battery formed of a primary battery and a secondary battery, and a solar battery, the conventional power source unit may be configured such that one of the battery and the solar battery having a higher output voltage is selected. In this case, when an output voltage of the battery is higher than an output voltage of the solar battery, the battery is selected even though the solar battery outputs the voltage sufficiently high to drive a system to which the conventional power source unit supplies power. Accordingly, the battery tends to be run out more quickly. In the conventional power source unit, when the solar battery is used more often, it is possible to prevent the battery from running out more quickly.

In view of the problems of the conventional semiconductor device described above, an object of the present invention is to provide a semiconductor device, a power source unit, and an electrical device capable of preventing a desired one of batteries constituting a power source from running out more quickly. Accordingly, it is possible to improve efficiency of the power source unit as a whole.

Further objects and advantages of the invention will be apparent from the following description of the invention.

SUMMARY OF THE INVENTION

In order to attain the objects described above, according to a first aspect of the present invention, a semiconductor device includes a first signal outputting portion; a second signal outputting portion; and a voltage outputting portion.

According to the first aspect of the present invention, the first signal outputting portion is configured to compare a level of a first voltage output from a first power source and a level of a second voltage output from a second power source, and to output a first signal representing a comparison result. The second signal outputting portion is configured to determine whether the level of the second voltage is greater than a level of a threshold voltage, and to output a second signal representing a determination result.

According to the first aspect of the present invention, the voltage outputting portion is configured to output the second voltage as an output voltage from an output terminal when the second signal indicates that the level of the second voltage is greater than the level of the threshold voltage. Further, the voltage outputting portion is configured to output one of the first voltage and the second voltage as the output voltage from the output terminal according to the first voltage when the second signal indicates that the level of the second voltage is smaller than the level of the threshold voltage.

According to a second aspect of the present invention, a semiconductor device includes a comparator; and a voltage outputting portion.

According to the second aspect of the present invention, the comparator includes a first terminal for receiving a first voltage output from a first power source and a second terminal for receiving a second voltage output from a second power source. Further, the comparator is configured to compare a level of the first voltage and a level of the second voltage in a state that the comparator has an input offset, and to output a first signal representing a comparison result.

According to the second aspect of the present invention, the voltage outputting portion is configured to output the second voltage as an output voltage from an output terminal when the first signal indicates that the level of the second voltage is greater than the level of the threshold voltage. Further, the voltage outputting portion is configured to output the first voltage as the output voltage from the output terminal when the first signal indicates that the level of the second voltage is smaller than the level of the threshold voltage.

According to the second aspect of the present invention, the comparator is configured to have the input offset so that the comparator outputs the first signal indicating that the level of the second voltage is greater than the level of the first voltage when the level of the first voltage is equal to the level of the second voltage.

According to a third aspect of the present invention, a power source unit includes the semiconductor device in the first aspect or the second aspect, and at least one of the first power source and the second power source.

According to a fourth aspect of the present invention, an electrical device includes the power source unit in the third aspect and a functional portion operating with the output voltage as a power source voltage.

According to the present invention, it is possible to prevent one of a plurality of power sources constituting the power source unit from running more quickly. Accordingly, it is possible to improve efficiency of the power source unit as a whole.

BRIEF DESCRIPTION OF THE DRAWINGS

FIG. 4 is a table showing a relationship between a logic value and an output signal of a logic circuit of the power source unit according to the first embodiment of the present invention;

FIG. 7 is a table showing a relationship between a logic value and an output signal of a logic circuit of the power source unit according to the second embodiment of the present invention;

DETAILED DESCRIPTION OF PREFERRED EMBODIMENTS

Hereunder, preferred embodiments of the present invention will be explained with reference to the accompanying drawings. In the following description, a same component or a corresponding component is designated with a same reference number in the accompanying drawings.

First Embodiment

Figure 1:
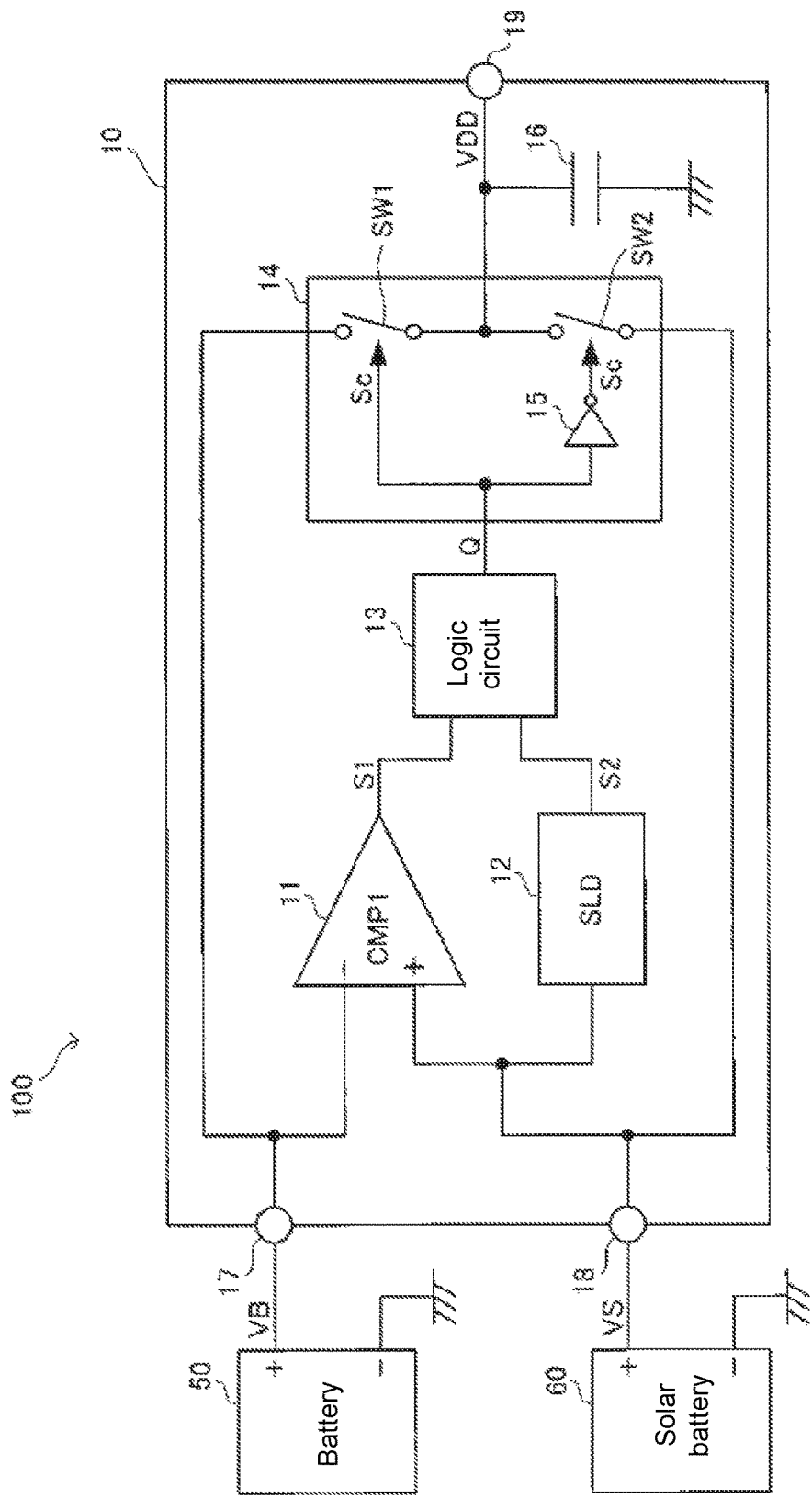
FIG. 1 is a block diagram showing a configuration of a power source unit according to a first embodiment of the present invention.

A first embodiment of the present invention will be explained. FIG. 1 is a block diagram showing a configuration of a power source unit 100 according to the first embodiment of the present invention. As shown in FIG. 1, the power source unit 100 includes a semiconductor device 10; a battery 50; and a solar battery 60.

In the first embodiment, the battery 50 may be formed of, for example, a primary battery such as a dry cell battery and the like, or a secondary battery such as a lithium-ion battery and the like. The battery 50 is configured to output a battery voltage VB between a positive electrode and a negative electrode thereof, and the battery voltage VB is input into an input terminal 17 of the semiconductor device 10.

In the first embodiment, the solar battery 60 is an electric component for converting solar energy to electric power and outputting electric power. For example, the solar battery 60 may be formed of a photo diode of a pn connection type. The solar battery 60 is configured to output a solar voltage VS between a positive electrode and a negative electrode thereof, and the solar voltage VS is input into an input terminal 18 of the semiconductor device 10.

In the first embodiment, the semiconductor device 10 constitutes a power source circuit configured to select one of the battery voltage VB and the solar voltage VS input into the input terminal 17 and the input terminal 18, respectively. Further, the semiconductor device 10 is configured to output one of the battery voltage VB and the solar voltage VS thus selected as an output voltage VDD from an output terminal 18. As shown in FIG. 1, the semiconductor device 10 includes a comparator (CMP1) 11; a solar voltage detection circuit (SLD) 12; a logic circuit 13; an output circuit 14; and a capacitor 16.

In the first embodiment, the comparator (CMP1) 11 has an inversion input terminal connected to the input terminal 17 of the semiconductor device 10 and a non-inversion input terminal connected to the input terminal 18 of the semiconductor device 10. Accordingly, the battery voltage VB is input into the inversion input terminal of the comparator (CMP1) 11, and the solar voltage VS is input into the non-inversion input terminal of the comparator (CMP1) 11.

In the first embodiment, the comparator (CMP1) 11 is configured to compare a level of the battery voltage VB with a level of the solar voltage VS, and to output an output signal S1 representing a comparison result. When the level of the solar voltage VS is greater than the level of the battery voltage VB (VS>VB), the semiconductor device 10 is configured to output the output signal S1 with a logic value "1" (high level). When the level of the solar voltage VS is smaller than the level of the battery voltage VB (VS<VB), the semiconductor device 10 is configured to output the output signal S1 with a logic value "0" (low level). It should be noted that the comparator (CMP1) 11 outputs the output signal S1 to the logic circuit 13.

In the first embodiment, the solar voltage detection circuit (SLD) 12 has an input terminal connected to the input terminal 18 of the semiconductor device 10. Further, the solar voltage detection circuit (SLD) 12 is configured to determine whether the level of the solar voltage VS is greater than a level of a threshold value voltage VSOH, and to output an output signal S2 representing a comparison result. It should be noted that the level of the threshold value voltage VSOH is set, for example, at a minimum level sufficient enough to stably operate other system (not shown) that operates with the output voltage VDD of the semiconductor device 10 as a power source.

In the first embodiment, the level of the solar voltage VS is greater than the level of the threshold value voltage VSOH (VS>VSOH), the solar voltage detection circuit (SLD) 12 is configured to output the output signal S2 with the logic value "1" (high level). When the level of the solar voltage VS is smaller than the level of the threshold value voltage VSOH (VS<VSOH), the solar voltage detection circuit (SLD) 12 is configured to output the output signal S2 with the logic value "0" (low level). It should be noted that the solar voltage detection circuit (SLD) 12 outputs the output signal S2 to the logic circuit 13.

Figure 2:
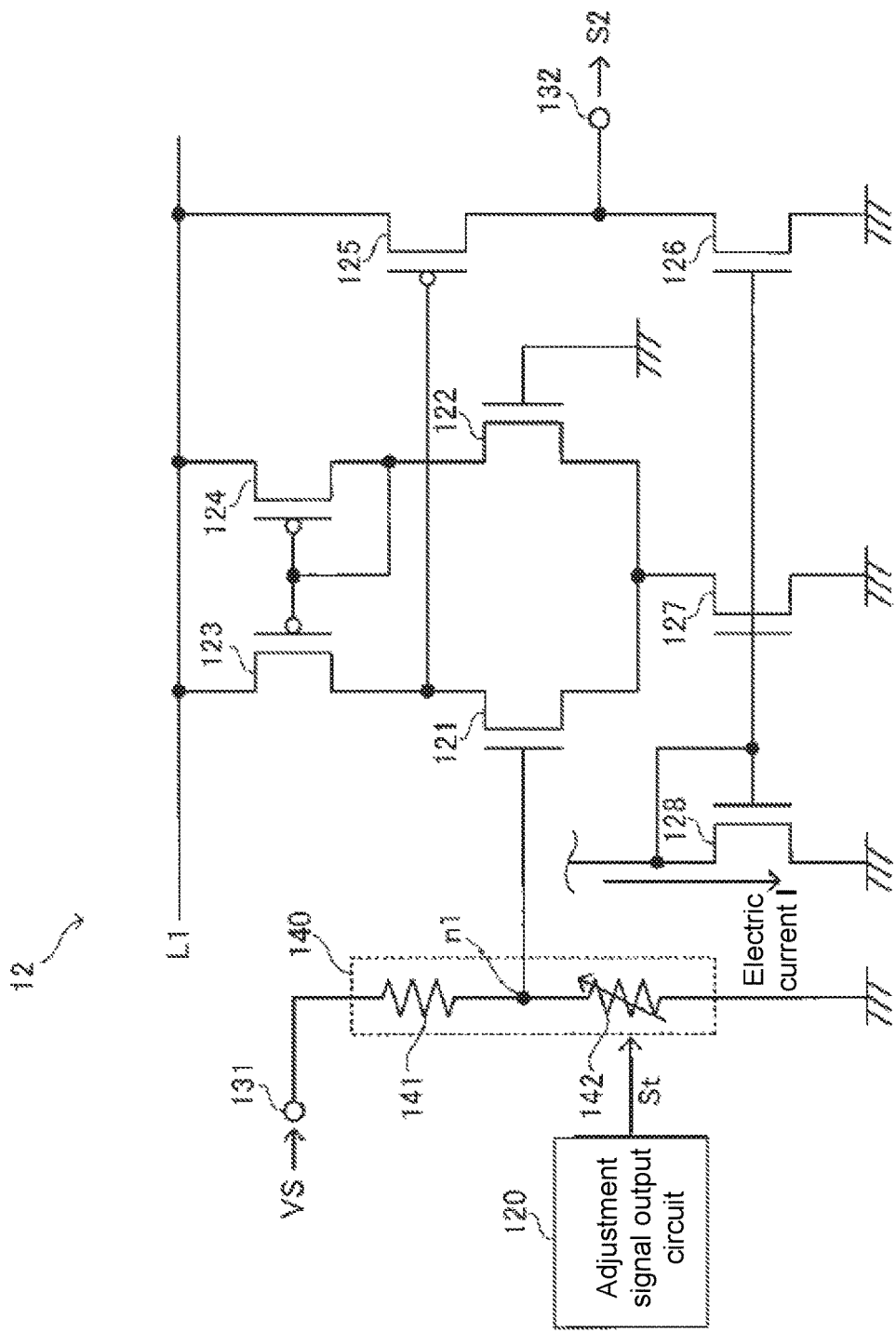
FIG. 2 is a circuit diagram showing a configuration of a solar voltage detection circuit of the power source unit according to the first embodiment of the present invention.

FIG. 2 is a circuit diagram showing a configuration of the solar voltage detection circuit 12 of the power source unit 100 according to the first embodiment of the present invention.

As shown in FIG. 2, the solar voltage detection circuit (SLD) 12 includes an adjustment signal output circuit 120; an N-MOS transistor 121; an N-MOS transistor 122; an N-MOS transistor 126; an N-MOS transistor 127; an N-MOS transistor 128; a P-MOS transistor 123; a P-MOS transistor 124; a P-MOS transistor 125; and a resistor circuit 140.

In the first embodiment, the resistor circuit 140 includes a resistor element 141 connected in series between a ground line and an input terminal 131 for receiving the solar voltage VS, and a variable resistor element 142. The resistor circuit 140 is configured to device the solar voltage VS at a voltage division ratio determined by resistivity values of the resistor element 141 and the variable resistor element 142, and to output a divided voltage from a connection point n1 between the resistor element 141 and the variable resistor element 142. It is configured such that the resistivity value of the variable resistor element 142 is adjustable according to an adjustment signal St output from the adjustment signal output circuit 120. When the resistivity value of the variable resistor element 142 is properly adjusted, it is possible to properly adjust the voltage division ratio of the resistor circuit 140.

In the first embodiment, the N-MOS transistor 121 is connected to a connection point n1 between the resistor element 141 and the variable resistor element 142. Further, the N-MOS transistor 121 has a drain connected to a drain of the P-MOS transistor 123, and a source connected to a drain of the N-MOS transistor 127. Accordingly, the divided voltage obtained through dividing the solar voltage VS with the resistor circuit 140 is supplied to a gate of the N-MOS transistor 121. The N-MOS transistor 122 has a gate connected to the ground line, a drain connected to a drain of the P-MOS transistor 124, and a source connected to the drain of the N-MOS transistor 127.

In the first embodiment, each of the P-MOS transistor 123 and the P-MOS transistor 124 has a source connected to a power source line L1, and a gate connected to the drain of the P-MOS transistor 124. The P-MOS transistor 125 has a source connected to the power source line L1, a gate connected to the drain of the N-MOS transistor 121, and a drain connected to an output terminal 132. It should be noted that a specific internal power source voltage is supplied to the power source line L1.

In the first embodiment, the N-MOS transistor 126 has a drain connected to the output terminal 132, and a source connected to the ground line. The N-MOS transistor 127 has the drain connected to the sources of the N-MOS transistor 121 and the N-MOS transistor 122, and a source connected to the ground line. The N-MOS transistor 128 has a drain and a gate connected to an electrical current supply line to which a constant electrical current is supplied. The gates of the N-MOS transistor 126, the N-MOS transistor 127, and the N-MOS transistor 128 are connected each other.

In the first embodiment, the N-MOS transistor 122 is formed of a filed effect transistor of a depletion type, and is configured to turn on even when a gate voltage is zero. On the other hand, the N-MOS transistor 121 is formed of a filed effect transistor of an enhancement type, and is configured to turn off when a gate voltage is zero and turn on when a gate voltage greater than a specific threshold voltage is supplied.

In the first embodiment, when the level of the solar voltage VS is smaller than the level of the threshold value voltage VSOH, the N-MOS transistor 121 is turned off and the N-MOS transistor 122 is turned on. As a result, an electrical current flows through the P-MOS transistor 124, and the P-MOS transistor 123 increases a gate voltage of the P-MOS transistor 125. Accordingly, the P-MOS transistor 125 is turned off, and the output signal S2 output from the output terminal 132 becomes the low level, that is, has the logic value "0".

In the first embodiment, when the level of the solar voltage VS is greater than the level of the threshold value voltage VSOH, the N-MOS transistor 121 is turned on and the N-MOS transistor 122 is turned off. As a result the N-MOS transistor 121 decreases the gate voltage of the P-MOS transistor 125. Accordingly, the P-MOS transistor 125 is turned on, and the output signal S2 output from the output terminal 132 becomes the high level, that is, has the logic value "1".

It should be noted that the threshold value voltage VSOH corresponds to the solar voltage VS when the logic value of the output signal S2 is switched and the output signal S2 is output according to the solar voltage VS. In the solar voltage detection circuit (SLD) 12, when the resistivity value of the variable resistor element 142 to adjust the voltage division ratio of the resistor circuit 140, it is possible to change the threshold value voltage VSOH.

Figure 3:
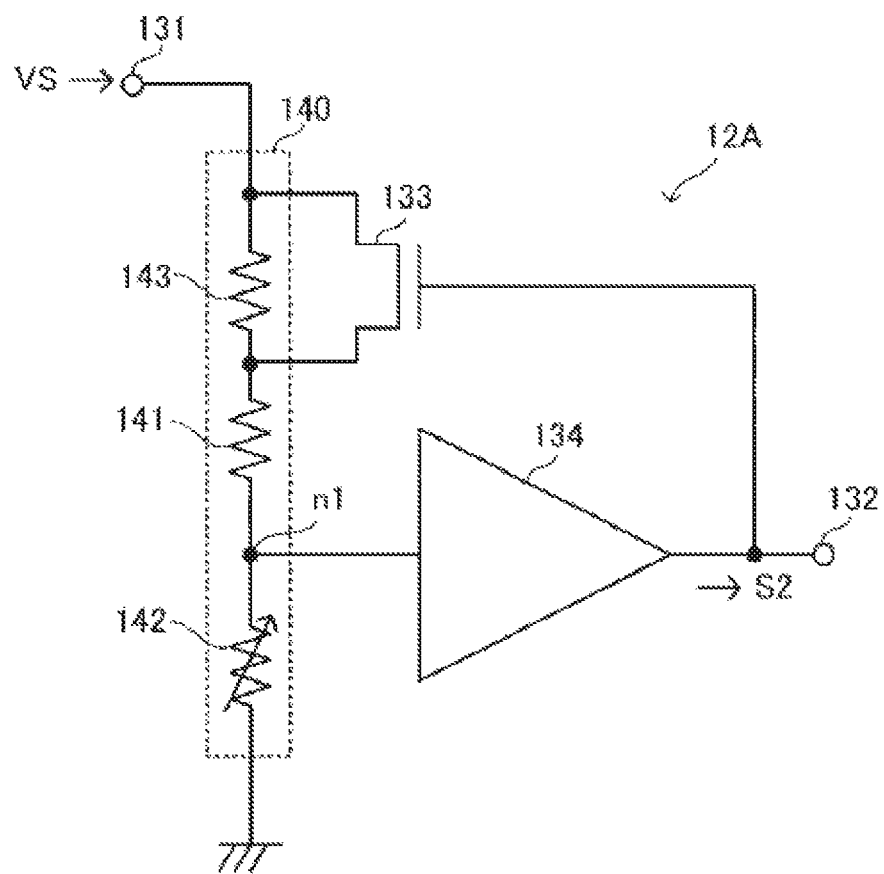
FIG. 3 is a circuit diagram showing a modified configuration of the solar voltage detection circuit of the power source unit according to the first embodiment of the present invention.

FIG. 3 is a circuit diagram showing a modified configuration of a solar voltage detection circuit 12A of the power source unit 100 according to the first embodiment of the present invention. It should be noted that the solar voltage detection circuit (SLD) 12A has a hysteresis property.

As shown in FIG. 3, in addition to the configuration of the solar voltage detection circuit (SLD) 12, the solar voltage detection circuit (SLD) 12A further includes a resistor element 143 disposed in the resistor circuit 140 and a transistor 133 that becomes an on state when the output signal S2 has the logic value "1". The resistor element 143 has one end portion connected to the input terminal 131 and a drain of the transistor 133, and the other end portion connected to one end portion of the resistor element 141 and a source of the transistor 133.

In the solar voltage detection circuit (SLD) 12A, when the logic value of the output signal S2 is changed from "0" to "1", the transistor 133 is switched from the off state to the one state. Accordingly, a potential at the connection point n1 increases. As a result, it is possible for the solar voltage detection circuit (SLD) 12A to stably output the output signal S2 having the logic value "1". As described above, when the solar voltage detection circuit (SLD) 12A has the hysteresis property, it is possible to prevent chattering in the output signal S2.

In the first embodiment, it should be noted that the configurations of the solar voltage detection circuit (SLD) 12 and the solar voltage detection circuit (SLD) 12A shown in FIGS. 1 and 2 are just examples, and the present invention is not limited thereto. For example, the solar voltage detection circuit (SLD) 12 and the solar voltage detection circuit (SLD) 12A may be configured as a comparator for comparing the level of the threshold value voltage VSOH generated inside the circuit and the level of the solar voltage VS.

In the first embodiment, as shown in FIG. 1, the logic circuit 13 is configured to perform logical calculation with regard to the logic value of the output signal S1 of the comparator (CMP1) 11 and the logic value of the output signal S2 of the solar voltage detection circuit (SLD) 12, and to output an output signal Q representing a calculation result.

FIG. 4 is a table showing a relationship between the logic value and the output signal Q of the logic circuit 13 of the power source unit 100 according to the first embodiment of the present invention.

As shown in FIG. 4, when the output signal S1 of the comparator (CMP1) 11 has the logic value "0" and the output signal S2 of the solar voltage detection circuit (SLD) 12 has the logic value "0", the logic circuit 13 outputs the output signal Q having the logic value "1". Otherwise, the logic circuit 13 outputs the output signal Q having the logic value "0".

More specifically, when the level of the solar voltage VS is greater than the level of the threshold value voltage VSOH (the output signal S2 of the solar voltage detection circuit (SLD) 12 has the logic value "1") and the level of the solar voltage VS is greater than the level of the battery voltage VB (the output signal S1 of the comparator (CMP1) 11 has the logic value "1"), the logic circuit 13 outputs the output signal Q having the logic value "0" regardless of the magnitude relationship between the level of the solar voltage VS and the level of the battery voltage VB.

On the other hand, when the level of the solar voltage VS is smaller than the level of the threshold value voltage VSOH (the output signal S2 of the solar voltage detection circuit (SLD) 12 has the logic value "0") and the level of the solar voltage VS is greater than the level of the battery voltage VB (the output signal S1 of the comparator (CMP1) 11 has the logic value "1"), the logic circuit 13 outputs the output signal Q having the logic value "0". Further, when the level of the solar voltage VS is smaller than the level of the threshold value voltage VSOH (the output signal S2 of the solar voltage detection circuit (SLD) 12 has the logic value "0") and the level of the solar voltage VS is smaller than the level of the battery voltage VB (the output signal S1 of the comparator (CMP1) 11 has the logic value "0"), the logic circuit 13 outputs the output signal Q having the logic value "1".

In the first embodiment, as shown in FIG. 1, the output circuit 14 includes an inverter 15; a switch SW1, and a switch SW2. The switch S1 has one end portion connected to the input terminal 17 of the semiconductor device 10 and the other end portion connected to an output terminal 19 of the semiconductor device 10. The switch S2 has one end portion connected to the input terminal 18 of the semiconductor device 10 and the other end portion connected to the output terminal 19 of the semiconductor device 10. Accordingly, the output signal Q of the logic circuit 13 is supplied to the switch SW1 as an on-off control signal Sc while the output signal Q is maintaining the logic value thereof. Further, a signal having the logic value inverted from that of the output signal Q of the logic circuit 13 with the inverter 15 is supplied to the switch SW2 as the on-off control signal Sc. In other words, the on-off control signals Sc having the logic values different from each other are supplied to the switches SW1 and SW2.

In the first embodiment, when the on-off control signal Sc having the logic value "1" is supplied to the switches SW1 and SW2, the switches SW1 and SW2 become the on state. When the on-off control signal Sc having the logic value "0" is supplied to the switches SW1 and SW2, the switches SW1 and SW2 become the off state. In other words, in the output circuit 14, the switches SW1 and SW2 are turned on or off complementary.

In the first embodiment, when the switch SW1 becomes the on state and the switch SW2 becomes the off state, the battery voltage VB is output from the output terminal 19 as the output voltage VDD. On the other hand, when the switch SW1 becomes the off state and the switch SW2 becomes the on state, the solar voltage VS is output from the output terminal 19 as the output voltage VDD.

In the first embodiment, as shown in FIG. 1, the capacitor 16 is disposed between the output terminal 19 and the ground line, and functions as a bypass capacitor for minimizing a rapid fluctuation of the output voltage VDD. It should be noted that the capacitor 16 may be disposed outside the semiconductor device 10.

In the first embodiment, the battery 50 is an example of a first power source, and the solar battery 60 is an example of a second power source of the present invention. Further, the comparator (CMP1) 11 is an example of a first signal outputting portion, and the solar voltage detection circuit (SLD) 12 and the solar voltage detection circuit (SLD) 12A are an example of a second signal outputting portion of the present invention. Further, the logic circuit 13 and the output circuit 14 are an example of a voltage outputting portion of the present invention.

Figure 5:
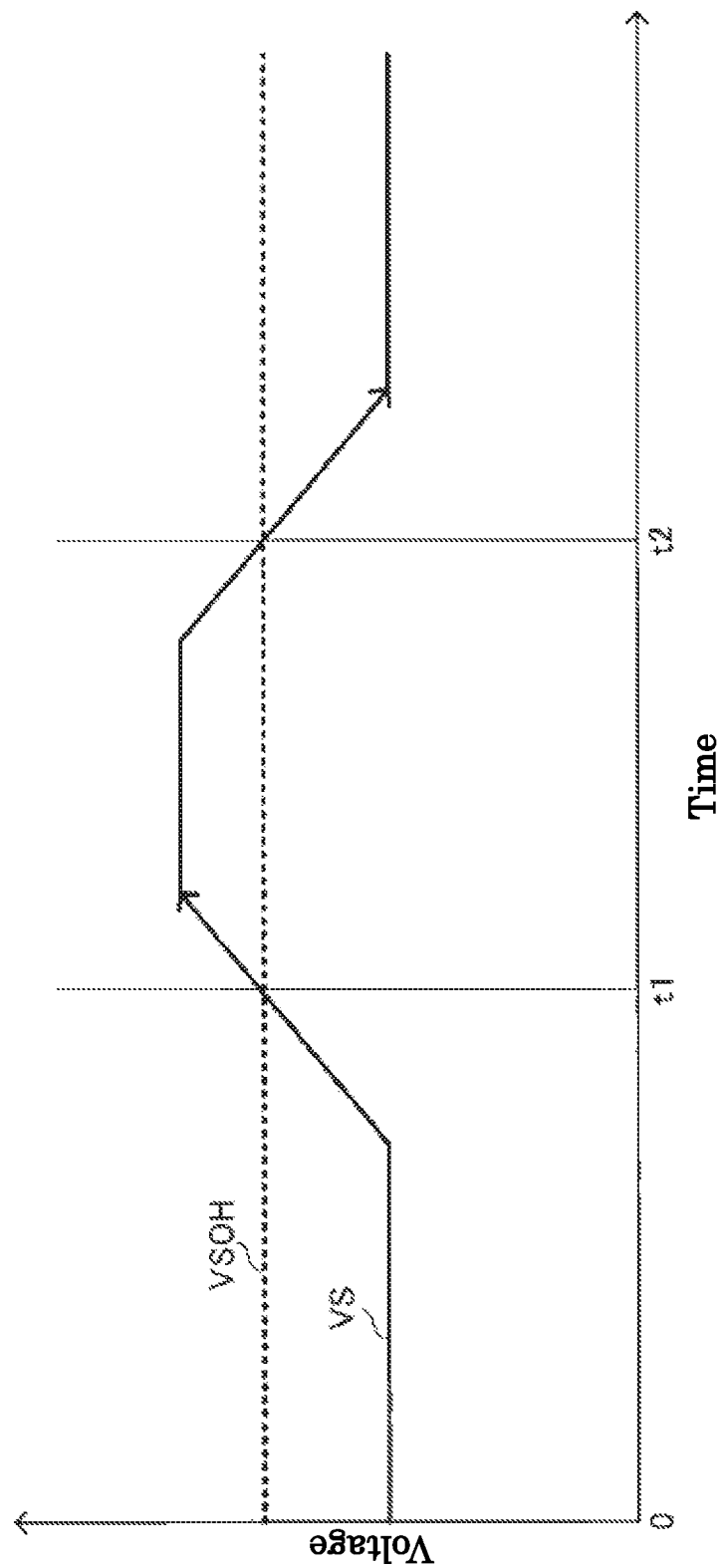
FIG. 5 is a graph showing an example of a time transition of a solar voltage of the power source unit according to the first embodiment of the present invention.

An operation of the semiconductor device 10 and the power source unit 100 will be explained next with reference to FIG. 5. FIG. 5 is a graph showing an example of a time transition of the solar voltage VS of the power source unit 100 according to the first embodiment of the present invention. In FIG. 5, the horizontal axis represents time, and the vertical axis represents the level of the solar voltage VS.

As shown in FIG. 5, during a period from a timing 0 to a timing t1, in which the level of the solar voltage VS is smaller than the level of the threshold value voltage VSOH, the solar voltage detection circuit (SLD) 12 outputs the output signal S2 having the logic value "0". When the output signal S2 has the logic value "0", the logic circuit 13 determines the logic value of the output signal Q according to the output signal S1 output from the comparator (CMP1) 11 representing the comparison result between the level of the battery voltage VB and the level of the solar voltage VS.

More specifically, when the level of the solar voltage VS is smaller than the level of the threshold value voltage VSOH (the output signal S2 of the solar voltage detection circuit (SLD) 12 has the logic value "0") and the level of the solar voltage VS is greater than the level of the battery voltage VB (the output signal S1 of the comparator (CMP1) 11 has the logic value "1"), the logic circuit 13 outputs the output signal Q having the logic value "0". Accordingly, the switch SW1 becomes the off state and the switch SW2 becomes the on state, and the solar voltage VS is output from the output terminal 19 as the output voltage VDD. On the other hand, when the level of the solar voltage VS is smaller than the level of the threshold value voltage VSOH (the output signal S2 of the solar voltage detection circuit (SLD) 12 has the logic value "0") and the level of the solar voltage VS is smaller than the level of the battery voltage VB (the output signal S1 of the comparator (CMP1) 11 has the logic value "0"), the logic circuit 13 outputs the output signal Q having the logic value "1". Accordingly, the switch SW1 becomes the on state and the switch SW2 becomes the off state, and the battery voltage VB is output from the output terminal 19 as the output voltage VDD.

In the first embodiment, during a period from the timing t1 to a timing t2, in which the level of the solar voltage VS is greater than the level of the threshold value voltage VSOH, the solar voltage detection circuit (SLD) 12 outputs the output signal S2 having the logic value "1". When the output signal S2 has the logic value "1", the logic circuit 13 outputs the output signal Q having the logic value "0" regardless of the logic value of the output signal S1 of the comparator (CMP1) 11. Accordingly, the switch SW1 becomes the off state and the switch SW2 becomes the on state, and the solar voltage VS is output from the output terminal 19 as the output voltage VDD.

In the first embodiment, during a period from the timing t2 to a timing t3, in which the level of the solar voltage VS is smaller than the level of the threshold value voltage VSOH, the semiconductor device 10 and the power source unit 100 perform the operation similar to that thereof during the period from the timing 0 to the timing t1.

As described above, in the semiconductor device 10 and the power source unit 100 in the first embodiment, when the level of the solar voltage VS is greater than the level of the threshold value voltage VSOH, the solar voltage VS is output as the output voltage VDD regardless of the magnitude relationship between the level of the solar voltage VS and the level of the battery voltage VB. In other words, when the level of the solar voltage VS is greater than the level of the threshold value voltage VSOH, the solar battery 60 is preferably utilized, thereby improving usage efficiency of the solar battery 60. At the same time, it is possible to prevent the battery 50 from running out, thereby improving availability of the power source unit 100 as a whole.

Further, in the semiconductor device 10 and the power source unit 100 in the first embodiment, the level of the threshold value voltage VSOH may be set at a minimum level sufficiently capable of stably operating other system that operates with the output voltage VDD as a drive power source. Accordingly, while improving usage efficiency of the solar battery 60, it is possible to stably operate other system during the preferred usage period of the solar battery 60.

Further, in the semiconductor device 10 and the power source unit 100 in the first embodiment, when the level of the solar voltage VS is smaller than the level of the threshold value voltage VSOH, one of the solar voltage VS and the battery voltage VB having a higher voltage level is output as the output voltage VDD. In other words, when the level of the solar voltage VS is smaller than the level of the threshold value voltage VSOH, the preferred usage of the solar battery 60 is cancelled, and one of the solar voltage VS and the battery voltage VB having a higher voltage level is utilized. Accordingly, it is possible to supply the maximum voltage that the power source unit 100 is capable of outputting to other system that operates with the output voltage VDD as the drive power source.

Further, in the semiconductor device 10 and the power source unit 100 in the first embodiment, when the resistivity of the variable resistor element 142 is adjusted, it is possible to adjust the level of the threshold value voltage VSOH. Accordingly, it is possible to set the voltage level of the solar battery 60 that is used preferably per each semiconductor device. Further, for example, in an inspection step, it is possible to adjust the resistivity of the variable resistor element 142 per each semiconductor device such that the level of the threshold value voltage VSOH becomes desirable. As a result, it is possible to minimize the fluctuation of the threshold value voltage VSOH caused by a manufacturing variance.

Second Embodiment

Figure 6:
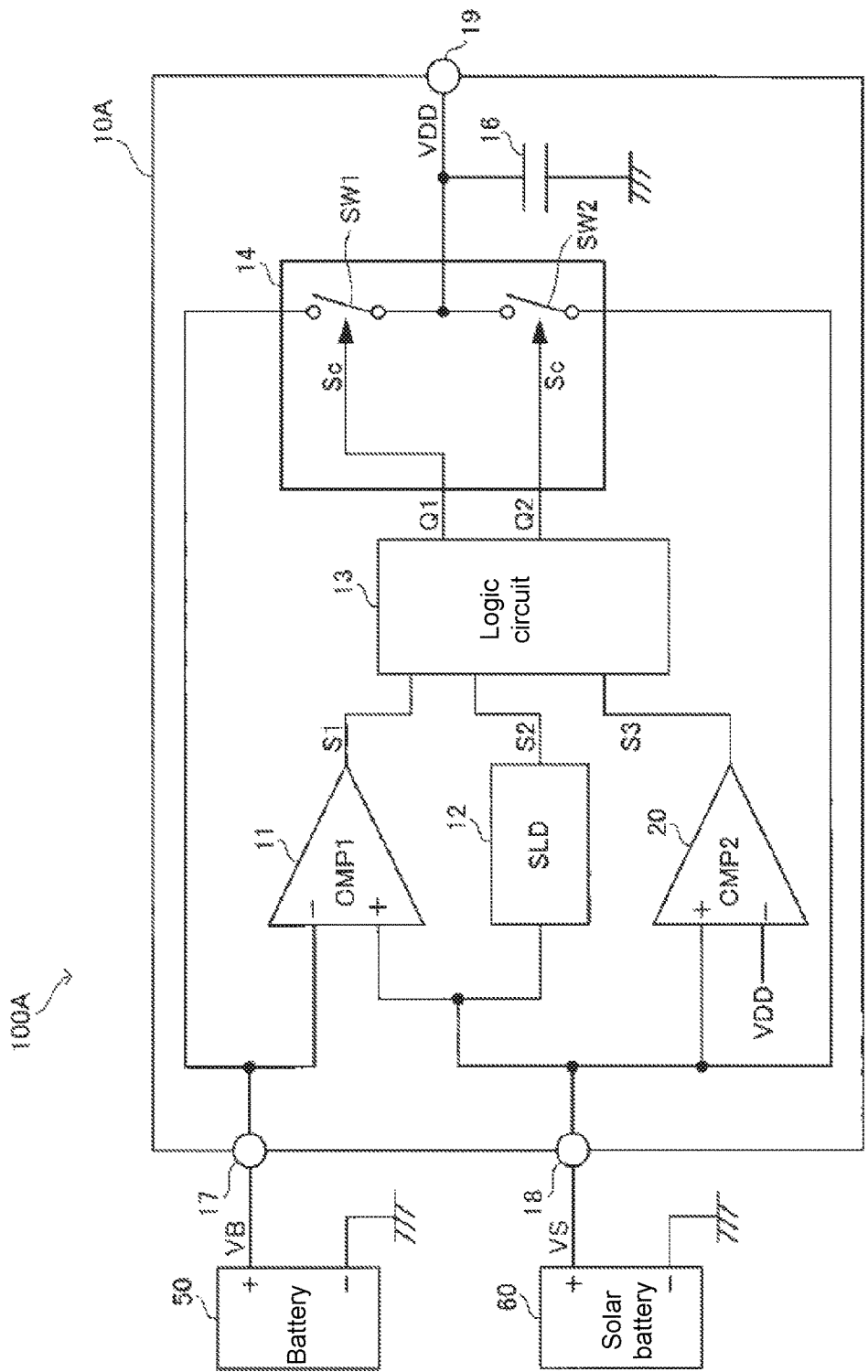
FIG. 6 is a block diagram showing a configuration of a power source unit according to a second embodiment of the present invention.

A second embodiment of the present invention will be explained next. FIG. 6 is a block diagram showing a configuration of a power source unit 100A including a semiconductor device 10A according to the second embodiment of the present invention.

As shown in FIG. 6, different from the semiconductor device 10 in the first embodiment, the semiconductor device 10A further includes a comparator (CMP2) 20. In the second embodiment, the comparator (CMP2) 20 has a non-inversion input terminal connected to the input terminal 18 of the semiconductor device 10A and an inversion input terminal connected to the output terminal 19 of the semiconductor device 10A. Accordingly, the solar voltage VS is input into the non-inversion input terminal of the comparator (CMP2) 20, and the output voltage VDD is input into the inversion input terminal of the comparator (CMP2) 20. In FIG. 6, it should be noted that a wiring line between the non-inversion input terminal of the comparator (CMP2) 20 and the output terminal 19 of the semiconductor device 10A is omitted for the sake of simplicity of the drawing.

In the second embodiment, the comparator (CMP2) 20 is configured to compare the level of the solar voltage VS with the level of the output voltage VDD, and to output an output signal S3 representing a comparison result. When the level of the solar voltage VS is greater than the level of the output voltage VDD (VS>VDD), the semiconductor device 10A is configured to output the output signal S3 with the logic value "1" (high level). When the level of the solar voltage VS is smaller than the level of the output voltage VDD (VS<VDD), the semiconductor device 10A is configured to output the output signal S1 with the logic value "0" (low level). It should be noted that the comparator (CMP2) 20 outputs the output signal S3 to the logic circuit 13, and the comparator (CMP2) 20 is an example of a third signal outputting portion of the present invention.

In the second embodiment, as shown in FIG. 6, the logic circuit 13 is configured to perform logical calculation with regard to the logic value of the output signal S1 of the comparator (CMP1) 11, the logic value of the output signal S2 of the solar voltage detection circuit (SLD) 12, and the logic value of the output signal S3 of the comparator (CMP2) 20. Further, the logic circuit 13 is configured to output an output signal Q1 and an output signal Q2 representing a calculation results.

FIG. 7 is a table showing a relationship between the logic value and the output signals Q1 and Q2 of the logic circuit 13 of the power source unit 100 according to the second embodiment of the present invention.

As shown in FIG. 7, when the output signal S3 of the comparator (CMP2) 20 has the logic value "1", the comparator (CMP2) 20 outputs the output signal Q1 with regard to the output signal S1 and the output signal S2 having the logic value similar to the logic value of the output signal Q in the first embodiment. Further, the logic circuit 13 outputs the output signal Q2 having the logic value inverted from that of the output signal Q1. On the other hand, when the output signal S3 of the comparator (CMP2) 20 has the logic value "0", the comparator (CMP2) 20 outputs the output signal Q1 and the output signal Q2 having the logic value "0". However, in a case that both the output signal S1 and the output signal S2 have the logic value "0", the comparator (CMP2) 20 outputs the output signal Q1 having the logic value "1" and the output signal Q2 having the logic value "0" regardless of the output signal S3.

In the second embodiment, as shown in FIG. 6, the output circuit 14 includes the switch SW1 and the switch SW2. The switch S1 has one end portion connected to the input terminal 17 of the semiconductor device 10A and the other end portion connected to the output terminal 19 of the semiconductor device 10A. The switch S2 has one end portion connected to the input terminal 18 of the semiconductor device 10A and the other end portion connected to the output terminal 19 of the semiconductor device 10A. Accordingly, the output signal Q1 of the logic circuit 13 is supplied to the switch SW1 as the on-off control signal Sc while the output signal Q1 is maintaining the logic value thereof. Further, the output signal Q2 of the logic circuit 13 is supplied to the switch SW2 as the on-off control signal Sc while the output signal Q2 is maintaining the logic value thereof. Accordingly, when the on-off control signal Sc having the logic value "1" is supplied to the switches SW1 and SW2, the switches SW1 and SW2 become the on state. When the on-off control signal Sc having the logic value "0" is supplied to the switches SW1 and SW2, the switches SW1 and SW2 become the off state.

In the second embodiment, when the switch SW1 becomes the on state and the switch SW2 becomes the off state, the battery voltage VB is output from the output terminal 19 as the output voltage VDD. On the other hand, when the switch SW1 becomes the off state and the switch SW2 becomes the on state, the solar voltage VS is output from the output terminal 19 as the output voltage VDD.

Figure 8:
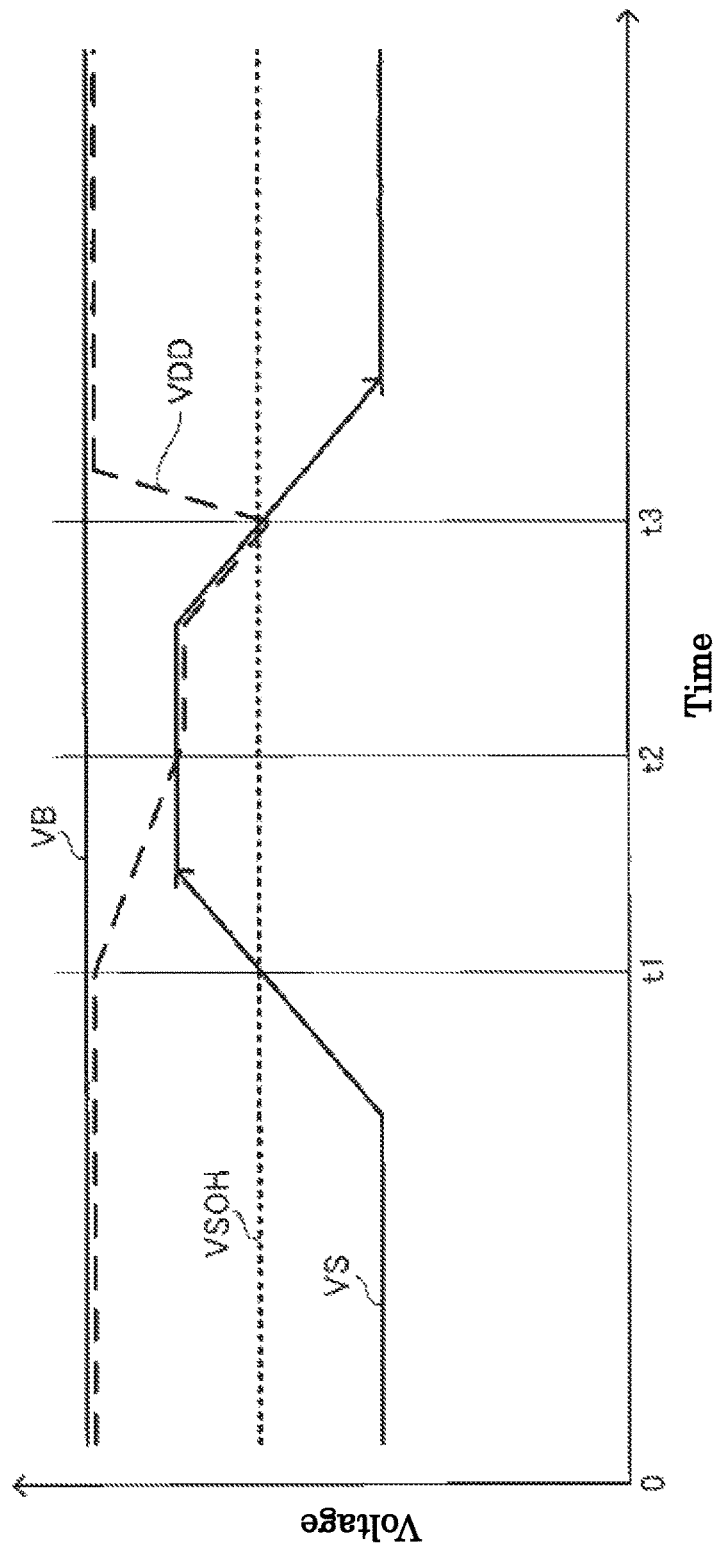
FIG. 8 is a graph showing an example of a time transition of a solar voltage, a battery voltage, and an output voltage of the power source unit according to the second embodiment of the present invention.

An operation of the semiconductor device 10A and the power source unit 100A will be explained next with reference to FIG. 8. FIG. 8 is a graph showing an example of a time transition of the solar voltage VS, the battery voltage VB, and the output voltage VDD of the power source unit 100A according to the second embodiment of the present invention. In FIG. 5, the horizontal axis represents time, and the vertical axis represents the levels of the solar voltage VS, the battery voltage VB, and the output voltage VDD. It is supposed that the level of the solar voltage VS is smaller than the level of the battery voltage VB over an entire period as shown in FIG. 8.

As described above, the level of the solar voltage VS is smaller than the level of the battery voltage VB over an entire period. Accordingly, the comparator (CMP1) 11 outputs the output signal S1 having the logic value "0". As shown in FIG. 8, during a period from the timing 0 to the timing t1, the level of the solar voltage VS is smaller than the level of the threshold value voltage VSOH. Accordingly, the solar voltage detection circuit (SLD) 12 outputs the output signal S2 having the logic value "0". When the output signal S1 has the logic value "0" and the output signal S2 has the logic value "0", the logic circuit 13 outputs the output signal Q1 having the logic value "1" and the output signal Q2 having the logic value "0" regardless of the logic value of the output signal S3 of the comparator (CMP2) 20. Accordingly, the switch SW1 becomes the on state and the switch SW2 becomes the off state, and the battery voltage VB is output from the output terminal 19 as the output voltage VDD.

As shown in FIG. 8, at the timing t1, when the level of the solar voltage VS increases and exceeds the level of the threshold value voltage VSOH, the solar voltage detection circuit (SLD) 12 outputs the output signal S2 having the logic value "1". Further, at the timing t1, the level of the solar voltage VS is still below the level of the battery voltage VB. Accordingly, the comparator (CMP2) 20 outputs the output signal S3 having the logic value "0". Further, the comparator (CMP1) 11 continues to output the output signal S1 having the logic value "0". As a result, the logic circuit 13 outputs the output signal Q1 having the logic value "0" and the output signal Q2 having the logic value "0". Accordingly, the switch SW1 becomes the off state and the switch SW2 becomes the off state, and the output terminal 19 becomes a high impedance state.

In the second embodiment, the level of the output voltage VDD is greater than the level of the solar voltage VS. Accordingly, if the switch SW2 is switched to the on state immediately after the level of the solar voltage VS exceeds the level of the threshold value voltage VSOH, electrical charges accumulated in the capacitor 16 are flowing into the solar battery 60.

Figure 9:
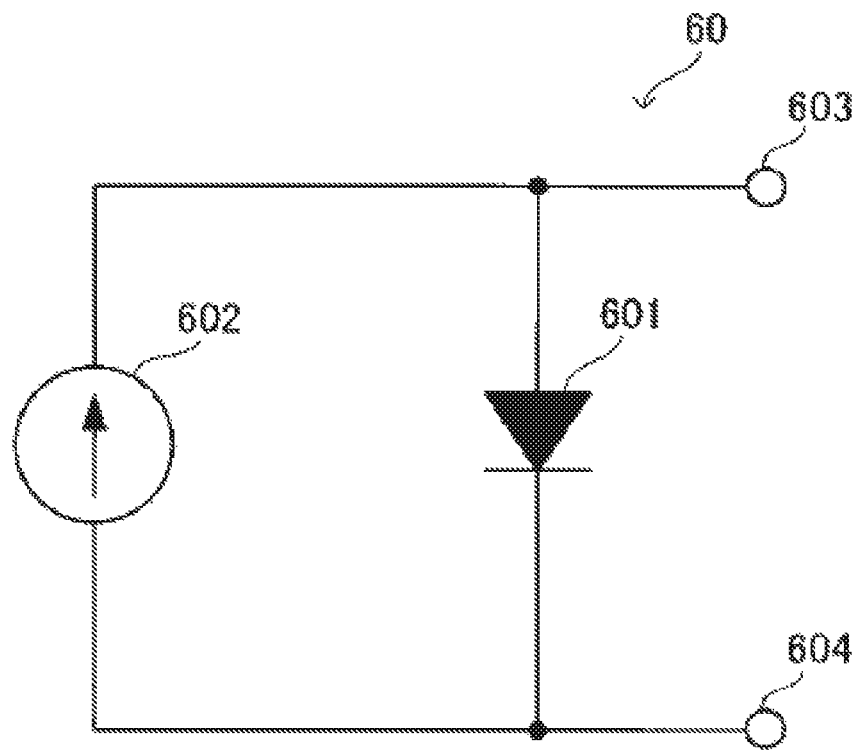
FIG. 9 is a circuit diagram showing an equivalent circuit of a solar battery of the power source unit according to the second embodiment of the present invention.

FIG. 9 is a circuit diagram showing an equivalent circuit of the solar battery 60 of the power source unit 100A according to the second embodiment of the present invention.

As shown in FIG. 9, the solar battery 60 includes an electrical current source 602 and a photo diode 601 of a PN connection type connected in parallel between a positive electrode 603 and a negative electrode 604 thereof. When the electrical charges are flowing into the solar battery 60 from the capacitor 16, the electrical charges are flowing through the PN connection of the photo diode 601. More specifically, when the level of the output voltage VDD is greater than the level of the solar voltage VS, and the switch SW2 is switched to the on state, the photo diode 601 of the solar battery 60 consumes power.

In the semiconductor device 10A and the power source unit 100A in the second embodiment, in the case that the level of the solar voltage VS is greater than the level of the threshold value voltage VSOH, and the solar battery 60 is preferably utilized, when the level of the output voltage VDD is greater than the level of the solar voltage VS, the switch SW1 becomes the off state and the switch SW2 becomes the off state, and the output terminal 19 becomes the high impedance state. Accordingly, it is possible to prevent the electrical charges from flowing into the solar battery 60 from the capacitor 16. As a result, it is possible to prevent the solar battery 60 from consuming power.

As shown in FIG. 8, when the output terminal 19 becomes the high impedance state, the electrical charges accumulated in the capacitor 16 are discharged. Accordingly, the output voltage VDD is gradually decreased. When the level of the solar voltage VS exceeds the level of the output voltage VDD at the timing t2, the output signal S3 of the comparator (CMP2) 20 has the logic value "1". Further, the comparator (CMP1) 11 continues to output the output signal S1 having the logic value "0", and the solar voltage detection circuit (SLD) 12 continues to output the output signal S2 having the logic value "1". As a result, the logic circuit 13 outputs the output signal Q1 having the logic value "0" and the output signal Q2 having the logic value "1". Accordingly, the switch SW1 becomes the off state and the switch SW2 becomes the on state, and the solar voltage VS is output from the output terminal 19 as the output voltage VDD.

In the second embodiment, when the level of the solar voltage VS is decreased and becomes below the level of the threshold value voltage VSOH at the timing t3, the solar voltage detection circuit (SLD) 12 outputs the output signal S2 having the logic value "0", and the comparator (CMP1) 11 continues to output the output signal S1 having the logic value "1". As a result, the logic circuit 13 outputs the output signal Q1 having the logic value "1" and the output signal Q2 having the logic value "0" regardless of the logic value of the output signal S3 of the comparator (CMP2) 20. Accordingly, the switch SW1 becomes the on state and the switch SW2 becomes the off state, and the battery voltage VB is output from the output terminal 19 as the output voltage VDD.

As described above, in the semiconductor device 10A and the power source unit 100A in the second embodiment, when the solar battery 60 is preferably utilized, and the level of the output voltage VDD is greater than the level of the solar voltage VS, the switch SW1 becomes the off state and the switch SW2 becomes the off state. Accordingly, it is possible to prevent the electrical charges from flowing into the solar battery 60 from the capacitor 16. As a result, it is possible to prevent the solar battery 60 from consuming power.

In the second embodiment, it should be noted that, when the level of the solar voltage VS is greater than the level of the threshold value voltage VSOH, the solar voltage detection circuit (SLD) 12 is configured not to supply the solar voltage VS for a specific period of time. Further, the comparator (CMP1) 11 and the comparator (CMP2) 20 may be configured not to supply the solar voltage VS as the output voltage VDD even when the level of the solar voltage VS exceeds a specific level. In this case, the comparator (CMP1) 11 and the comparator (CMP2) 20 may be formed of a hysteresis comparator. With the configuration described above, it is possible to reduce a switching noise near the threshold value voltage VSOH and prevent the chattering. Further, the comparator (CMP2) 20 is configured to compare the solar voltage VS with the output voltage VDD, it is necessary to constantly monitor the fluctuation of the output voltage VDD with regard to the comparator (CMP2) 20. For this reason, only the comparator (CMP1) 11 may be formed of a hysteresis comparator.

Further, in the semiconductor device 10A and the power source unit 100A in the second embodiment, similar to the semiconductor device 10 and the power source unit 100 in the first embodiment, when the level of the solar voltage VS is greater than the level of the threshold value voltage VSOH, the solar battery 60 is preferably utilized. Accordingly, it is possible to increase the usage of the solar battery 60 and prevent the battery 50 from running out, thereby improving availability of the power source unit 100 as a whole.

Third Embodiment

Figure 10:
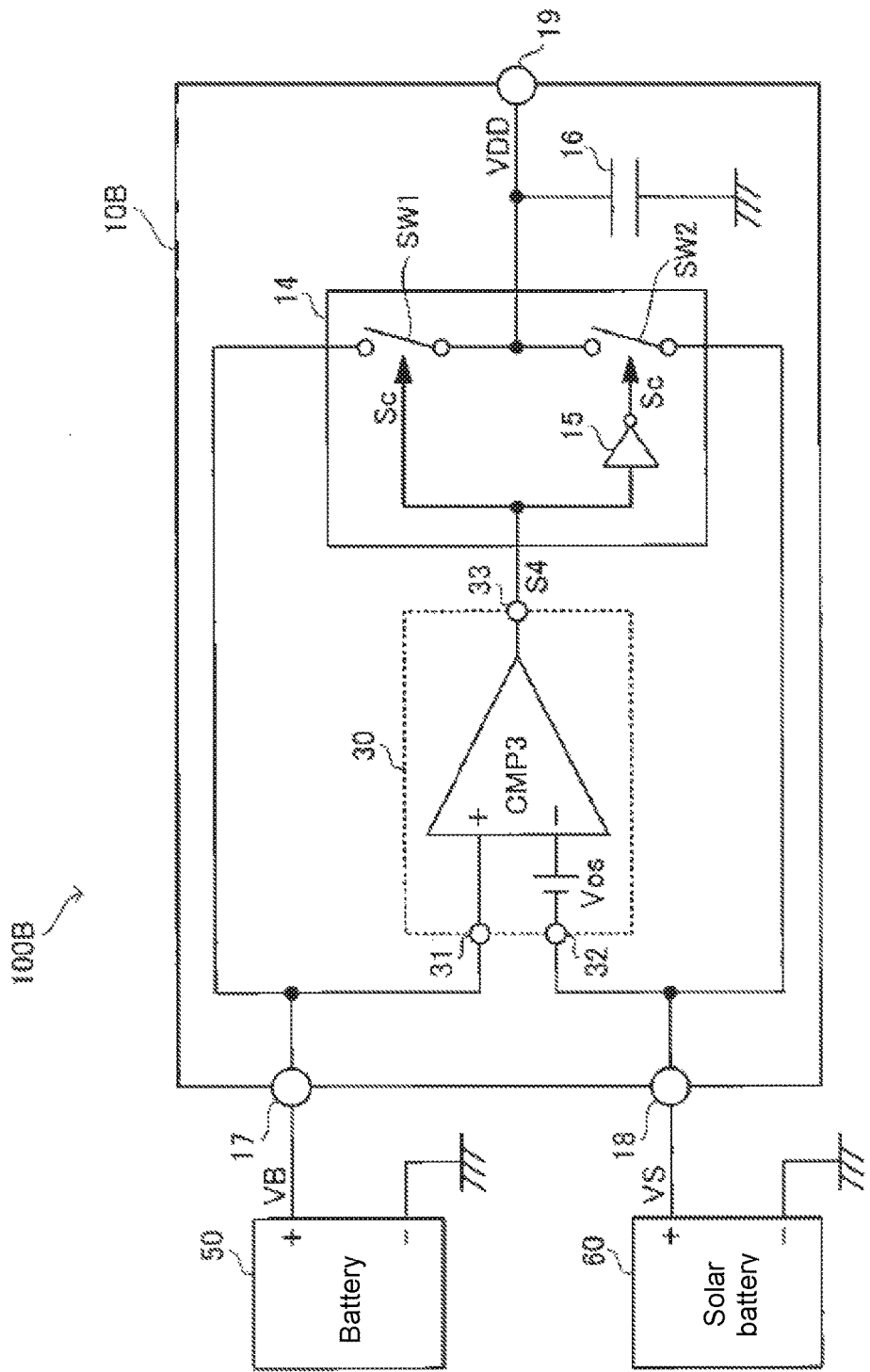
FIG. 10 is a block diagram showing a configuration of a power source unit according to a third embodiment of the present invention.

A third embodiment of the present invention will be explained next. FIG. 10 is a block diagram showing a configuration of a power source unit 100B including a semiconductor device 10B according to the third embodiment of the present invention.

As shown in FIG. 10, the semiconductor device 10B includes a comparator (CMP3) 30 and the output circuit 14. Different from the first embodiment, the semiconductor device 10B does not include the comparator (CMP1) 11, the solar voltage detection circuit (SLD) 12, and the logic circuit 13.

In the third embodiment, the comparator (CMP3) 30 has a non-inversion input terminal 31, an inversion input terminal 33, and an output terminal 33. The non-inversion input terminal 31 is connected to the input terminal 17 of the semiconductor device 10B, so that the non-inversion input terminal 31 receives the battery voltage VB. The non-inversion input terminal 32 is connected to the input terminal 18 of the semiconductor device 10B, so that the inversion input terminal 33 receives the solar voltage VS.

In the third embodiment, the comparator (CMP3) 30 is configured to compare the level of the battery voltage VB with the level of the solar voltage VS in a state that the comparator (CMP3) 30 has an input offset, and to output an output signal S4 representing a comparison result. The input offset is set such that when the level of the battery voltage VB is equal to the level of the solar voltage VS (VS>VDD), the comparator (CMP3) 30 is configured to output the output signal S4 (the logic value "0") representing that the level of the solar voltage VS is greater than the level of the battery voltage VB. More specifically, as shown in FIG. 10, the comparator (CMP3) 30 is configured to compare the level of the battery voltage VB input into the non-inversion input terminal 31 with the level of a voltage VS1 that is a sum of the solar voltage VS input into the inversion input terminal 32 and an offset voltage Vos.

Figure 11:
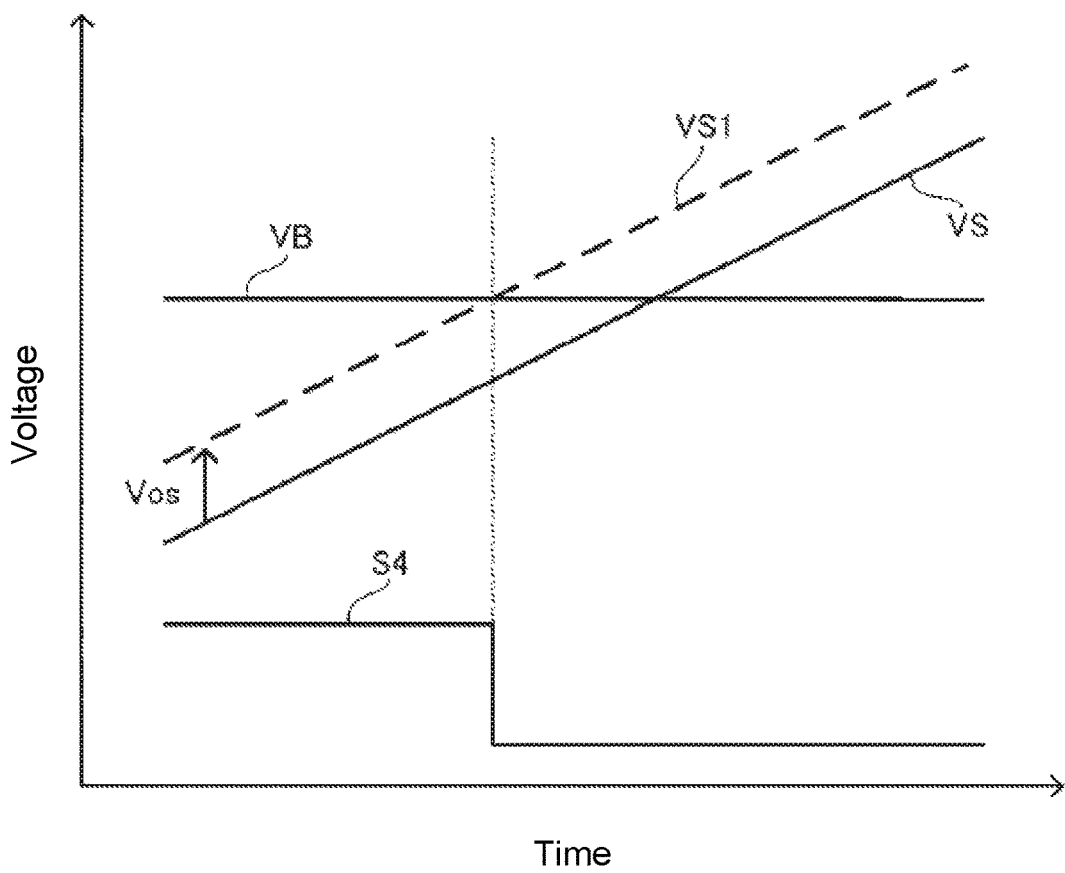
FIG. 11 is a graph showing an operation of a comparator of the power source unit according to the third embodiment of the present invention.

FIG. 11 is a graph showing an operation of the comparator 30 of the power source unit 100B according to the third embodiment of the present invention. In FIG. 11, the horizontal axis represents time, and the vertical axis represents a voltage level.

As shown in FIG. 11, when the level of the voltage VS1, which is the sum of the solar voltage VS and the threshold value voltage VSOH, is smaller than the level of the battery voltage VB, the comparator (CMP3) 30 is configured to output an output signal S4 having the logic value "1". On the other hand, when the level of the voltage VS1, which is the sum of the solar voltage VS and the threshold value voltage VSOH, is greater than the level of the battery voltage VB, the comparator (CMP3) 30 is configured to output the output signal S4 having the logic value "0".

In the third embodiment, when the comparator (CMP3) 30 outputs the output signal S4 having the logic value "1", the switch SW1 becomes the on state and the switch SW2 becomes the off state. Accordingly, the battery voltage VB is output from the output terminal 19 as the output voltage VDD. On the other hand, when the comparator (CMP3) 30 outputs the output signal S4 having the logic value "0", the switch SW1 becomes the off state and the switch SW2 becomes the on state. Accordingly, the solar voltage VS is output from the output terminal 19 as the output voltage VDD.

As described above, in the semiconductor device 10B and the power source unit 100B in the third embodiment, the comparator (CMP3) 30 has the input offset. Accordingly, when the solar voltage VS is lower than the battery voltage VB, the solar voltage VS is output as the output voltage VDD. As a result, as compared with the configuration using the comparator without the input offset, it is possible to increase usage efficiency of the solar battery 60. Further, it is possible to prevent the battery 50 from running out, thereby improving availability of the power source unit 100 as a whole.

In the third embodiment, the comparator (CMP3) 30 may be configured to have a variable element for adjusting the threshold value voltage VSOH, so that the level of the input offset can be adjusted. With the configuration, it is possible to minimize the fluctuation in the level of the input offset caused by a manufacturing variance. Further, the comparator (CMP3) 30 may be configured to have the offset inside thereof. In this case, the comparator (CMP3) 30 is configured through changing to an existing hysteresis parameter.

Fourth Embodiment

Figure 12:
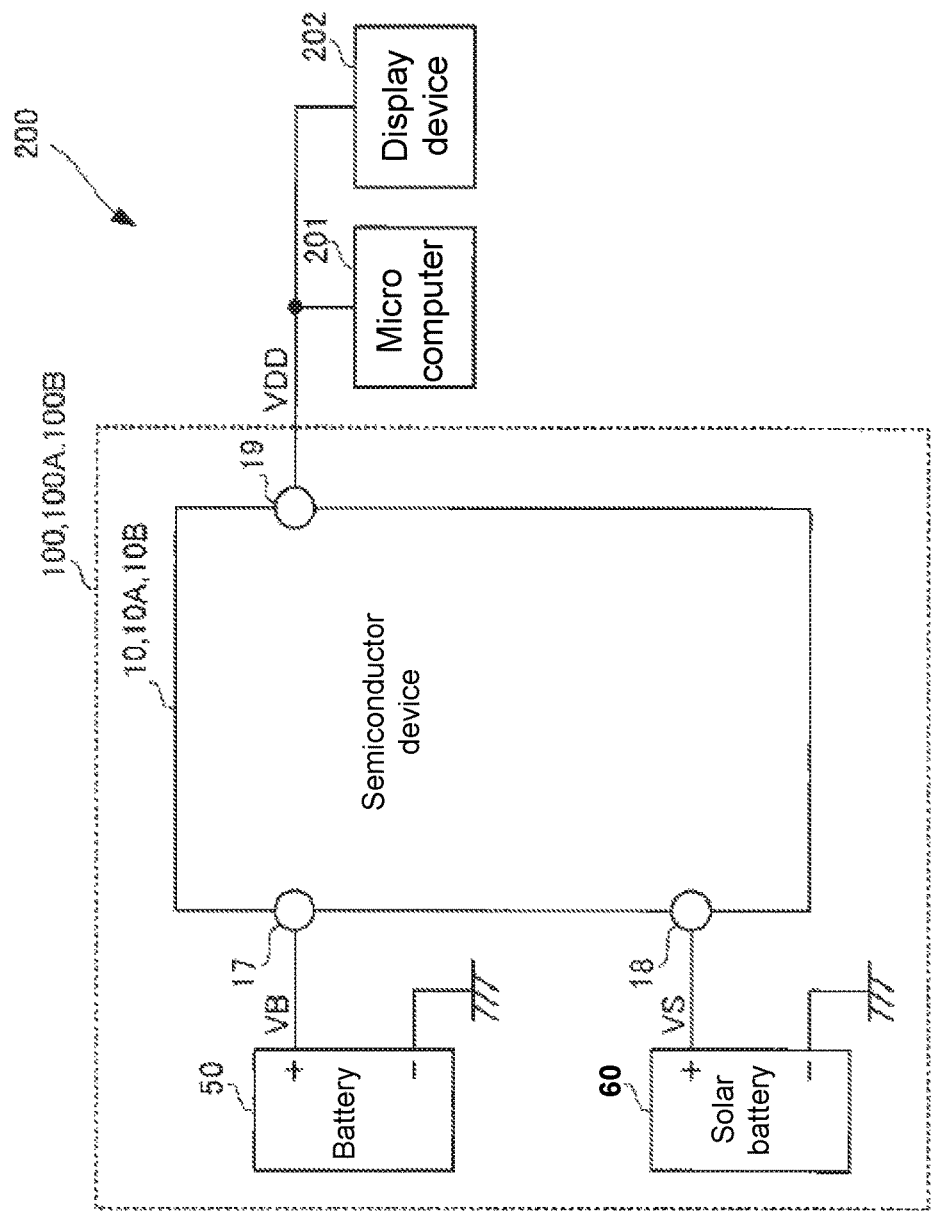
FIG. 12 is a block diagram showing a configuration of an electrical device according to a fourth embodiment of the present invention.

A fourth embodiment of the present invention will be explained next. FIG. 12 is a block diagram showing a configuration of an electrical device 200 including the power source unit 100, the power source unit 100A, or the power source unit 100B in the first to third embodiments according to the fourth embodiment of the present invention. As shown in FIG. 12, the electrical device 200 includes a micro computer 201 and a display device 202, and may further include other functional portion. Further, the electrical device 200 may be configured as a communication terminal device, a table calculator, a media player, or a digital clock. It should be noted that the micro computer 201 and the display device 202 are operated with the output voltage VDD output from the output terminal 19 of the power source unit 100, the power source unit 100A, or the power source unit 100B.

In the electrical device 200 in the fourth embodiment, it is possible to increase usage efficiency of the solar battery 60. Further, it is possible to prevent the battery 50 from running out. Accordingly, it is possible to prolong a replacement cycle or a recharging cycle of the battery 50, thereby improving convenience of a user thereof.

In the first to fourth embodiments described above, the battery 50 and the solar battery 60 are used as the power source, and the present invention is not limited thereto. In the semiconductor device and the power source unit according to the present invention, it is possible to use many types and many shapes of batteries. For example, instead of the solar battery 60, a direct current stabilized power source may be used as a power source that is preferably used.

Further, in the first to fourth embodiments described above, it is possible to arbitrarily set the logic values "0" and "1" of the output signal S1, the output signal S2, the output signal S3, the output signal S4, the output signal Q, the output signal Q1, and the output signal Q2. Accordingly, it is possible to adjust the calculation process of the logic circuit 13 and the operations relative to the logic value of the switch SW1 and the switch SW2.

The disclosure of Japanese Patent Application No. 2015-056588, filed on Mar. 19, 2015, is incorporated in the application by reference.

While the invention has been explained with reference to the specific embodiments of the invention, the explanation is illustrative and the invention is limited only by the appended claims.

What is claimed is:

1. A semiconductor device, comprising:
a first signal outputting portion;
a second signal outputting portion; and
a voltage outputting portion,
wherein said first signal outputting portion is configured to compare a level of a first voltage output from a first power source and a level of a second voltage output from a second power source, and to output a first signal representing a comparison result,
said second signal outputting portion is configured to determine whether the level of the second voltage is greater than a level of a threshold voltage, and to output a second signal representing a determination result,
said voltage outputting portion is configured to output the second voltage as an output voltage from an output terminal when the second signal indicates that the level of the second voltage is greater than the level of the threshold voltage, and
said voltage outputting portion is configured to output one of the first voltage and the second voltage as the output voltage from the output terminal according to the first voltage when the second signal indicates that the level of the second voltage is smaller than the level of the threshold voltage.

2. The semiconductor device according to claim 1, wherein said voltage outputting portion includes a logic circuit, a first switch, and a second switch,
said logic circuit is configured to perform a logic calculation relative to the first signal and the second signal,
said logic circuit is configured to output an output signal representing a logic calculation result,
said first switch is disposed between the output terminal and a first input terminal for receiving the first voltage,
said first switch is configured to turn on or off according to the output signal of the logic circuit,
said second switch is disposed between the output terminal and a second input terminal for receiving the second voltage, and
said second switch is configured to turn on or off according to the output signal of the logic circuit.

3. The semiconductor device according to claim 2, further comprising a third signal outputting portion configured to compare a level of the output voltage with the level of the second voltage,
wherein said third signal outputting portion is configured to output a third signal representing a comparison result,
said voltage outputting portion is configured to turn off the first switch and the second switch when the first signal indicates that the level of the first voltage is smaller than the level of the second voltage, the second signal indicates that the level of the second voltage is greater than the level of the threshold voltage, and the third signal indicates that the level of the output voltage is greater than the level of the second voltage.

4. The semiconductor device according to claim 1, wherein said second signal outputting portion includes a resistor circuit configured to adjust the threshold voltage.

5. A power source unit comprising the semiconductor device according to claim 1 and at least the second power source.

6. The power source unit according to claim 5, wherein said second power source is formed of a solar battery.

7. An electrical device comprising the power source unit according to claim 5 and a functional portion that operates with the output voltage as power source.

8. A semiconductor device, comprising:
a comparator; and
a voltage outputting portion,
wherein said comparator includes a first terminal for receiving a first voltage output from a first power source and a second terminal for receiving a second voltage output from a second power source,
said comparator further includes an input offset resistor connected in series to the second terminal,
said comparator is configured to compare a level of the first voltage and a level of the second voltage, and to output a first signal representing a comparison result,
said voltage outputting portion is configured to output the second voltage as an output voltage from an output terminal when the first signal indicates that the level of the second voltage is greater than the level of the threshold voltage,
said voltage outputting portion is configured to output the first voltage as the output voltage from the output terminal when the first signal indicates that the level of the second voltage is smaller than the level of the threshold voltage, and
said input offset resistor is configured so that the comparator outputs the first signal indicating that the level of the second voltage is greater than the level of the first voltage when the level of the first voltage is equal to the level of the second voltage.

9. A semiconductor device, comprising:
a first signal outputting portion;
a second signal outputting portion; and
a voltage outputting portion,
wherein said first signal outputting portion is configured to compare a level of a first voltage output from a first power source and a level of a second voltage output from a second power source, and to output a first signal representing a comparison result, said second signal outputting portion is configured to determine whether the level of the second voltage is greater than a level of a threshold voltage, and to output a second signal representing a determination result, said voltage outputting portion is configured to output the second voltage as an output voltage from an output terminal when the second signal indicates that the level of the second voltage is greater than the level of the threshold voltage, and said voltage outputting portion is configured to output one of the first voltage and the second voltage as the output voltage from the output terminal according to the first voltage when the second signal indicates that the level of the second voltage is smaller than the level of the threshold voltage, and said second signal outputting portion includes a resistor circuit configured to adjust the threshold voltage.

10. The semiconductor device according to claim 9, wherein said voltage outputting portion includes a logic circuit, a first switch, and a second switch, said logic circuit is configured to perform a logic calculation relative to the first signal and the second signal, said logic circuit is configured to output an output signal representing a logic calculation result, said first switch is disposed between the output terminal and a first input terminal for receiving the first voltage, said first switch is configured to turn on or off according to the output signal of the logic circuit, said second switch is disposed between the output terminal and a second input terminal for receiving the second voltage, and said second switch is configured to turn on or off according to the output signal of the logic circuit.

11. The semiconductor device according to claim 9, further comprising a third signal outputting portion configured to compare a level of the output voltage with the level of the second voltage, wherein said third signal outputting portion is configured to output a third signal representing a comparison result, said voltage outputting portion is configured to turn off the first switch and the second switch when the first signal indicates that the level of the first voltage is smaller than the level of the second voltage, the second signal indicates that the level of the second voltage is greater than the level of the threshold voltage, and the third signal indicates that the level of the output voltage is greater than the level of the second voltage.

* * * * *